US012335996B2

(12) United States Patent
Abedini et al.

(10) Patent No.: US 12,335,996 B2
(45) Date of Patent: Jun. 17, 2025

(54) TWO-STEP RANDOM ACCESS CHANNEL PROCEDURE

(71) Applicant: QUALCOMM Incorporated, San Diego, CA (US)

(72) Inventors: Navid Abedini, Basking Ridge, NJ (US); Muhammad Nazmul Islam, Littleton, MA (US); Jianghong Luo, Skillman, NJ (US); Naeem Akl, Somerville, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 17/450,224

(22) Filed: Oct. 7, 2021

(65) Prior Publication Data

US 2023/0116354 A1 Apr. 13, 2023

(51) Int. Cl.
*H04W 74/00* (2009.01)
*H04W 74/08* (2024.01)
*H04W 74/0833* (2024.01)

(52) U.S. Cl.
CPC ..... *H04W 74/004* (2013.01); *H04W 74/0833* (2013.01); *H04W 74/0866* (2013.01)

(58) Field of Classification Search
CPC ........... H04W 74/004; H04W 74/0833; H04W 74/0866; H04W 52/0206
See application file for complete search history.

(56) References Cited

U.S. PATENT DOCUMENTS

| 7,522,677 B2 * | 4/2009 | Liang ................. H04W 52/028 375/316 |
| 2015/0282068 A1 | 10/2015 | Rajagopal et al. | |

FOREIGN PATENT DOCUMENTS

| WO | WO-2011157290 A1 * | 12/2011 | ........ H04W 52/0206 |
| WO | WO-2014008032 A2 * | 1/2014 | ............ H04L 5/001 |
| WO | 2020223731 A1 | 11/2020 | |
| WO | WO-2021026118 A1 * | 2/2021 | ........ H04W 74/0833 |
| WO | WO-2023033841 A1 * | 3/2023 | |

OTHER PUBLICATIONS

CAICT (a 3GPP document "consideration on procedure for Two-step RACH," R1-1913026, published in 2019) (Year: 2019).*
International Search Report and Written Opinion—PCT/US2022/077523—ISA/EPO—Feb. 1, 2023.

* cited by examiner

*Primary Examiner* — Ivan O Latorre
(74) *Attorney, Agent, or Firm* — Guang Y. Zhang; Harrity & Harrity, LLP

(57) ABSTRACT

Various aspects of the present disclosure generally relate to wireless communication. In some aspects, a network node may receive a first message associated with initiating a random access channel (RACH) procedure. The network node may communicate one or more second messages associated with completing the RACH procedure, wherein a type of the RACH procedure is associated with a type of analog to digital converter used for communication. Numerous other aspects are described.

26 Claims, 10 Drawing Sheets

TWO-STEP RANDOM ACCESS CHANNEL PROCEDURE

FIELD OF THE DISCLOSURE

Aspects of the present disclosure generally relate to wireless communication and to techniques and apparatuses for an energy-saving two-step random access channel procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include receiving a first message associated with initiating a random access channel (RACH) procedure. The method may include communicating one or more second messages associated with completing the RACH procedure, wherein a type of the RACH procedure is associated with a type of analog to digital converter used for communication.

Some aspects described herein relate to a method of wireless communication performed by a network node. The method may include transmitting a first message associated with initiating a RACH procedure. The method may include communicating one or more second messages associated with completing the RACH procedure, wherein a type of the RACH procedure is associated with a type of analog to digital converter used for communication.

Some aspects described herein relate to a network node for wireless communication. The network node may include a memory and one or more processors coupled to the memory. The one or more processors may be configured to receive a first message associated with initiating a RACH procedure. The one or more processors may be configured to communicate one or more second messages associated with completing the RACH procedure, wherein a type of the RACH procedure is associated with a type of analog to digital converter used for communication.

Some aspects described herein relate to a network node for wireless communication. The network node may include a memory and one or more processors coupled to the memory. The one or more processors may be configured to transmit a first message associated with initiating a RACH procedure. The one or more processors may be configured to communicate one or more second messages associated with completing the RACH procedure, wherein a type of the RACH procedure is associated with a type of analog to digital converter used for communication.

Some aspects described herein relate to a non-transitory computer-readable medium that stores a set of instructions for wireless communication by a network node. The set of instructions, when executed by one or more processors of the network node, may cause the network node to receive a first message associated with initiating a RACH procedure. The set of instructions, when executed by one or more processors of the network node, may cause the network node to communicate one or more second messages associated with completing the RACH procedure, wherein a type of the RACH procedure is associated with a type of analog to digital converter used for communication.

Some aspects described herein relate to a non-transitory computer-readable medium that stores a set of instructions for wireless communication by a network node. The set of instructions, when executed by one or more processors of the network node, may cause the network node to transmit a first message associated with initiating a RACH procedure. The set of instructions, when executed by one or more processors of the network node, may cause the network node to communicate one or more second messages associated with completing the RACH procedure, wherein a type of the RACH procedure is associated with a type of analog to digital converter used for communication.

Some aspects described herein relate to an apparatus for wireless communication. The apparatus may include means for receiving a first message associated with initiating a RACH procedure. The apparatus may include means for communicating one or more second messages associated with completing the RACH procedure, wherein a type of the RACH procedure is associated with a type of analog to digital converter used for communication.

Some aspects described herein relate to an apparatus for wireless communication. The apparatus may include means for transmitting a first message associated with initiating a RACH procedure. The apparatus may include means for communicating one or more second messages associated with completing the RACH procedure, wherein a type of the RACH procedure is associated with a type of analog to digital converter used for communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
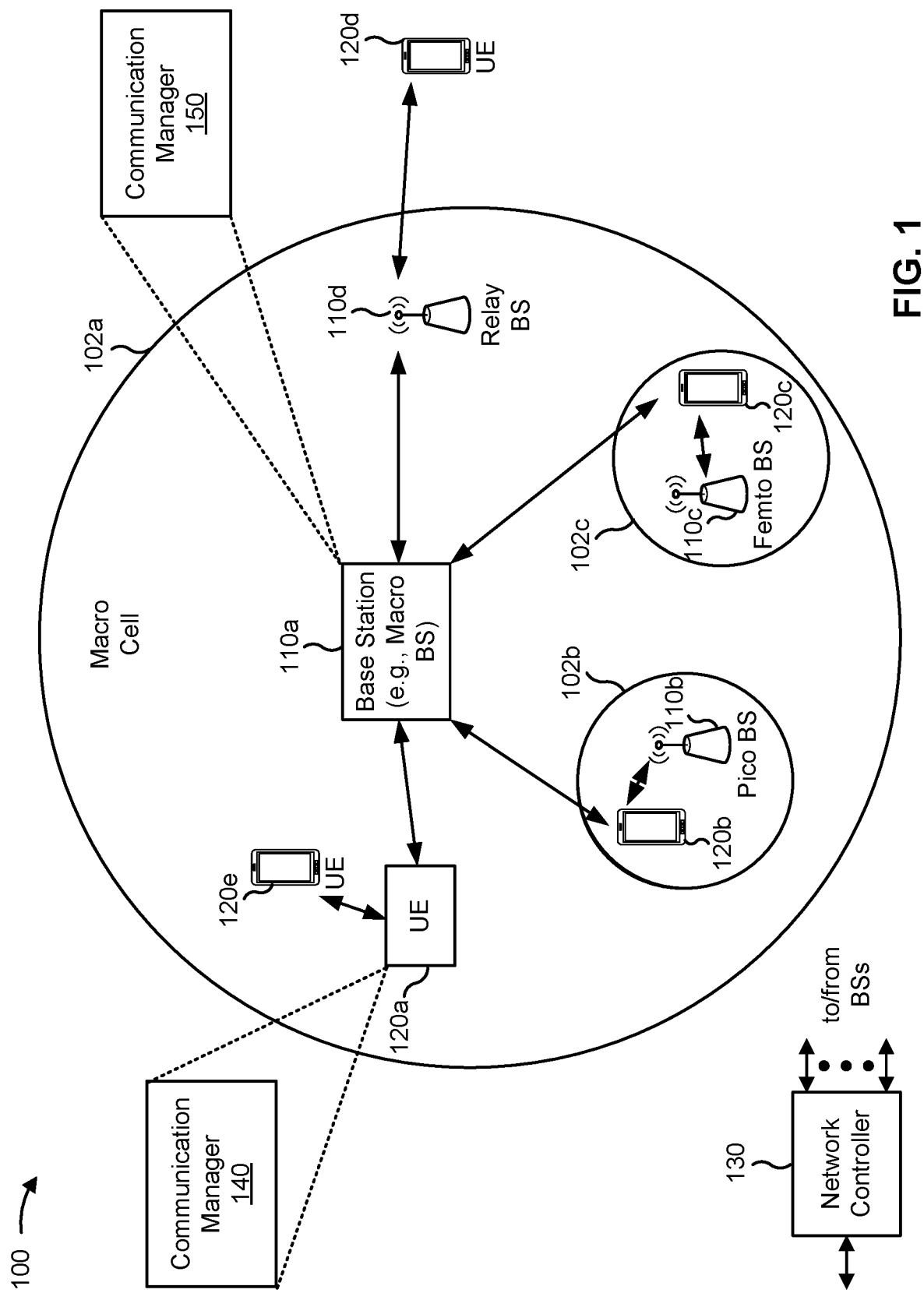
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., a base station 110) may include a communication manager 150. As described in more detail elsewhere herein, the communication manager 150 may receive a first message associated with initiating a random access channel (RACH) procedure; and communicate one or more second messages associated with completing the RACH procedure, wherein a type of the RACH procedure is associated with a type of analog to digital converter used for communication. Additionally, or alternatively, the communication manager 150 may perform one or more other operations described herein.

In some aspects, a network node (e.g., UE 120) may include a communication manager 140. As described in more detail elsewhere herein, the communication manager 140 may transmit a first message associated with initiating a RACH procedure; and communicate one or more second messages associated with completing the RACH procedure, wherein a type of the RACH procedure is associated with a type of analog to digital converter used for communication. Additionally, or alternatively, the communication manager 140 may perform one or more other operations described herein.

As indicated above, FIG. 1 is provided as an example. Other examples may differ from what is described with regard to FIG. 1.

Figure 2:
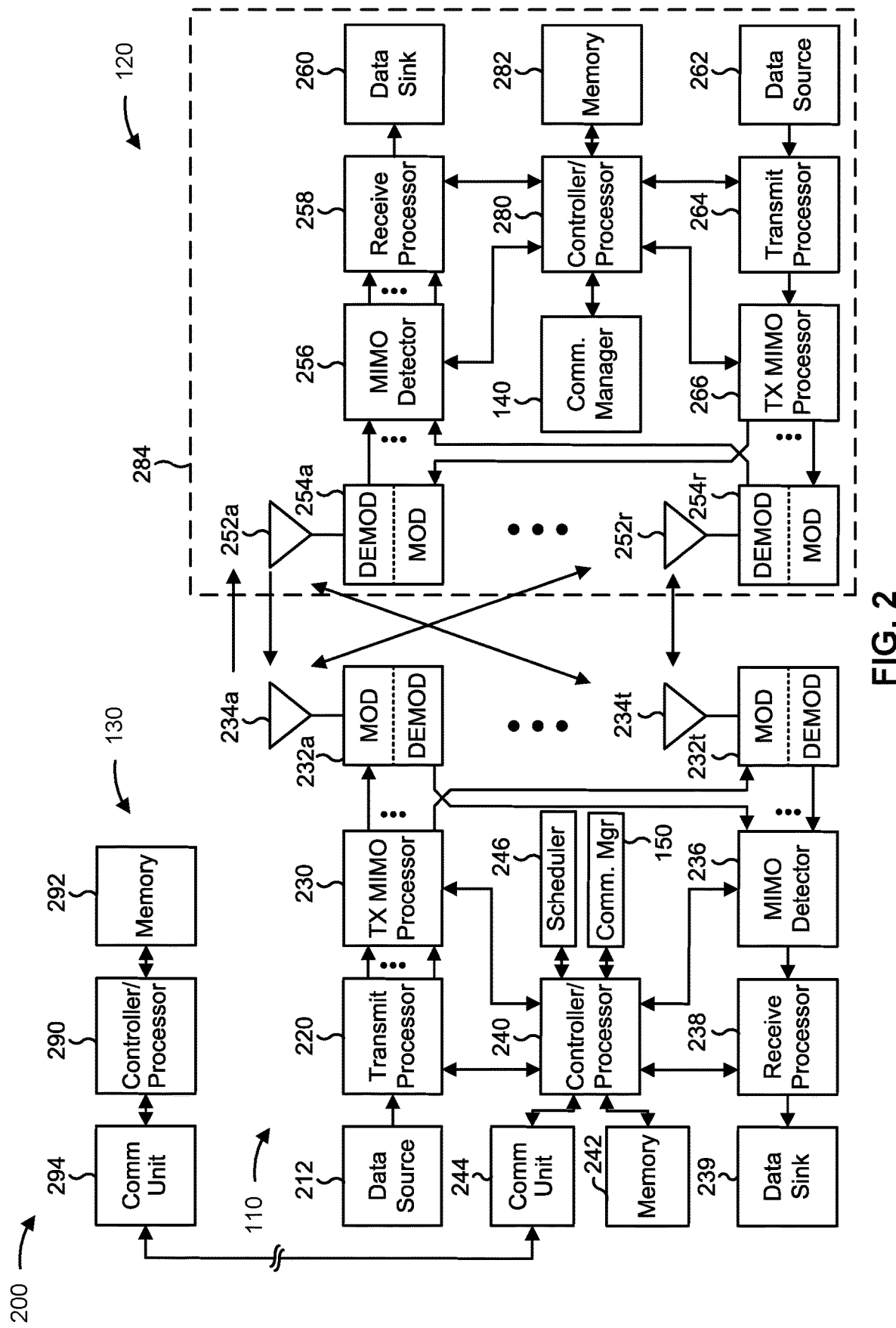
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-10).

The controller/processor 240 of the base station 110, the controller/processor 280 of the UE 120, and/or any other component(s) of FIG. 2 may perform one or more techniques associated with an energy-saving two-step random access channel procedure, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network node (e.g., the base station 110) includes means for receiving a first message associated with initiating a RACH procedure; and/or means for communicating one or more second messages associated with completing the RACH procedure, wherein a type of the RACH procedure is associated with a type of analog to digital converter used for communication. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a network node (e.g., the UE 120) includes means for transmitting a first message associated with initiating a RACH procedure; and/or means for communicating one or more second messages associated with completing the RACH procedure, wherein a type of the RACH procedure is associated with a type of analog to digital converter used for communication. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
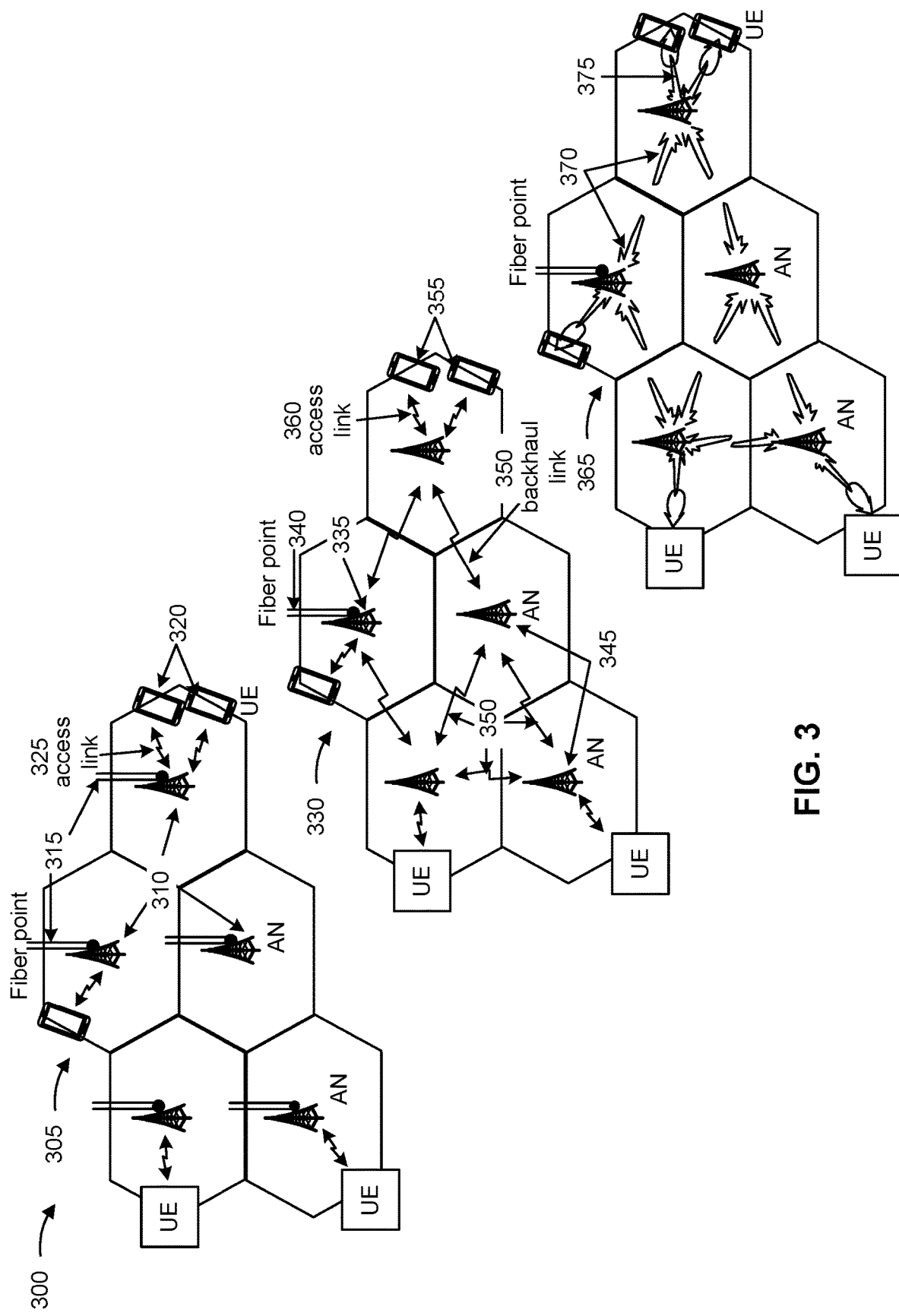
FIG. 3 is a diagram illustrating an example of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. A base station 310 shown in FIG. 3 may be a base station 110 shown in FIG. 1. A UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. An anchor base station 335 and/or a non-anchor base station 345 shown in FIG. 3 may be a base station 110 shown in FIG. 1. A UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

In an IAB network, such as is shown by reference numbers 330 and 365, each device may be referred to as a node or a network node. For example, a base station 345 may be a first network node and a UE 355 may be a second network node. Additionally, or alternatively, as described in more detail herein, a device may include multiple network nodes representing multiple hops in a communication path. For example, a base station 345 may be associated with a distributed architecture (e.g., a central unit (CU) and one or more distributed units (DUs), with each hop in the distributed architecture (e.g., the CU and each DU) being referred to as separate network nodes. In this case, a first network node (e.g., a CU) may communicate on a backhaul with a second network node (e.g., another CU) and may transmit, on a downlink, to a third network node (e.g., a DU, which may further transmit on a downlink to a fourth network node, such as a UE).

As indicated above, FIG. 3 is provided as an example. Other examples may differ from what is described with regard to FIG. 3.

Figure 4:
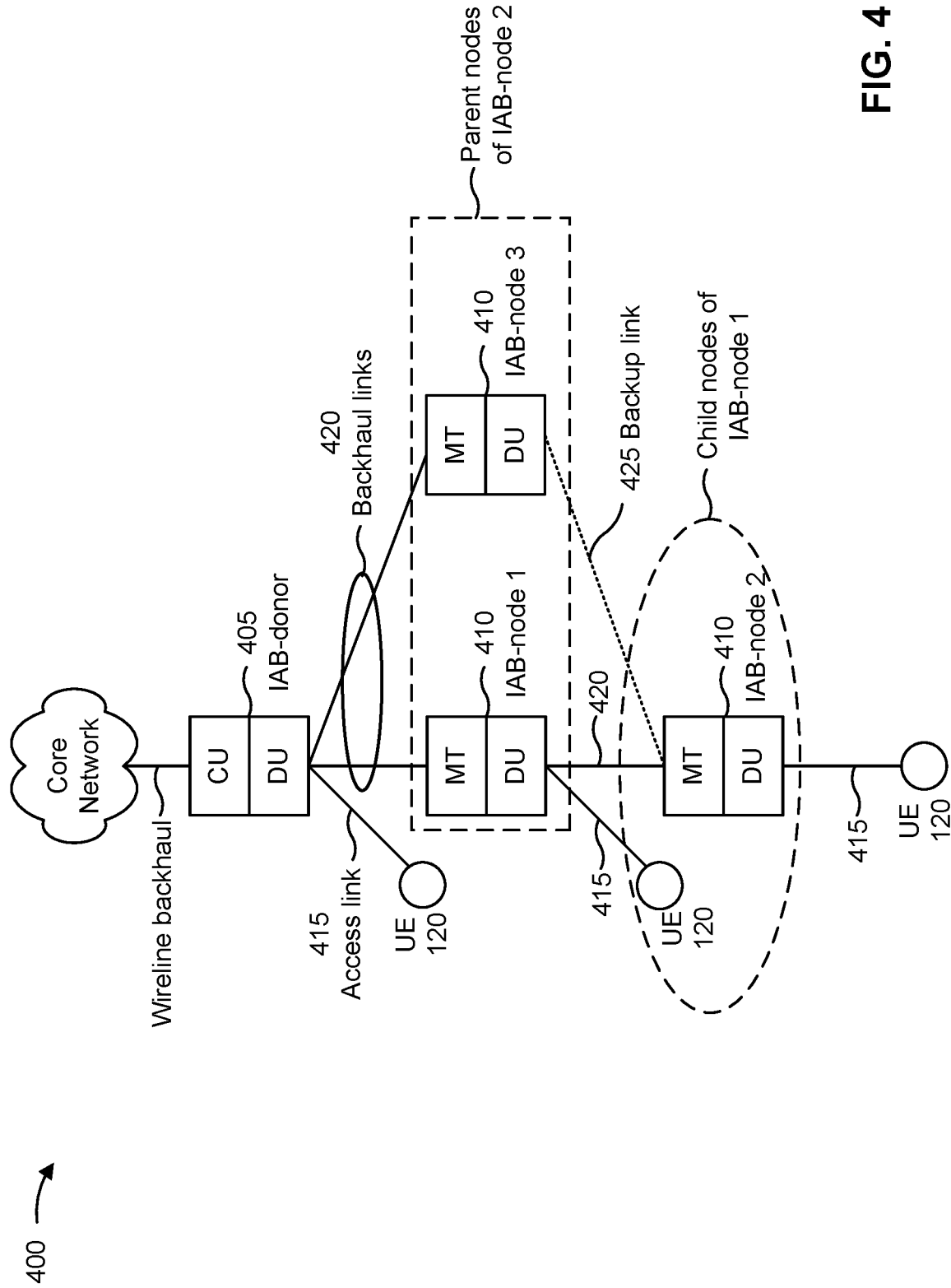
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). An IAB donor 405 may include a base station 110, such as an anchor base station, as described above in connection with 3. As shown, an IAB donor 405 may include a CU, which may perform access node controller (ANC) functions and/or AMF functions. The CU may configure a DU of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. An IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, "node," "network node," or "wireless node" may refer to an IAB donor 405 or an IAB node 410.

As indicated above, FIG. 4 is provided as an example. Other examples may differ from what is described with regard to FIG. 4.

Figure 5:
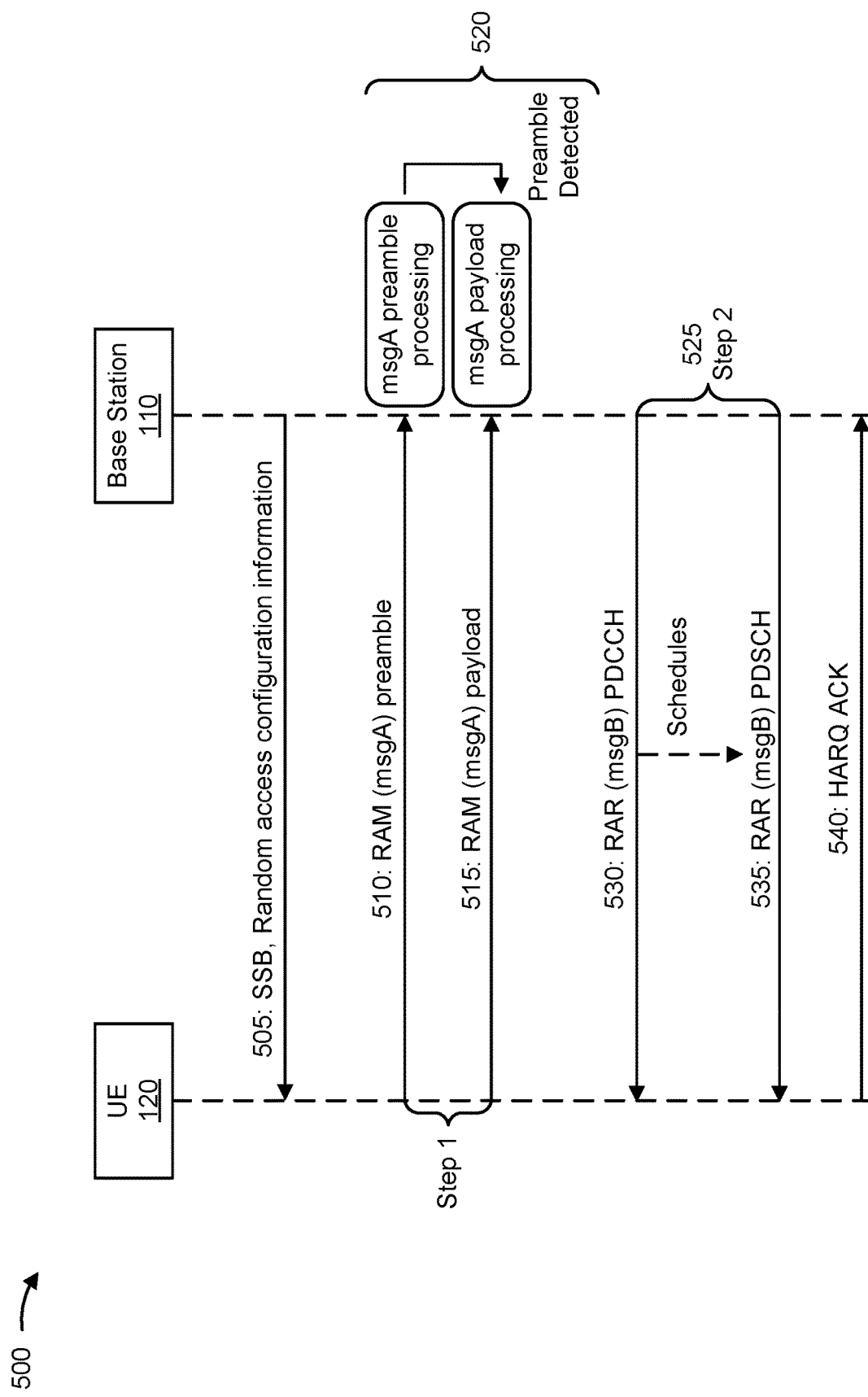
FIG. 5 is a diagram illustrating an example of a two-step random access procedure, in accordance with the present disclosure.

FIG. 5 is a diagram illustrating an example 500 of a two-step random access procedure, in accordance with the present disclosure. As shown in FIG. 5, a base station 110 and a UE 120 may communicate with one another to perform the two-step random access procedure.

As shown by reference number 505, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM) and/or receiving a random access response (RAR) to the RAM.

As shown by reference number 510, the UE 120 may transmit, and the base station 110 may receive, a RAM preamble. As shown by reference number 515, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a physical random access channel (PRACH) preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a physical uplink shared channel (PUSCH) transmission).

As shown by reference number 520, the base station 110 may receive the RAM preamble transmitted by the UE 120. If the base station 110 successfully receives and decodes the RAM preamble, the base station 110 may then receive and decode the RAM payload.

As shown by reference number 525, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 530, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 535, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 540, if the UE 120 successfully receives the RAR, the UE 120 may transmit a hybrid automatic repeat request (HARQ) acknowledgement (ACK).

As indicated above, FIG. 5 is provided as an example. Other examples may differ from what is described with regard to FIG. 5.

Figure 6:
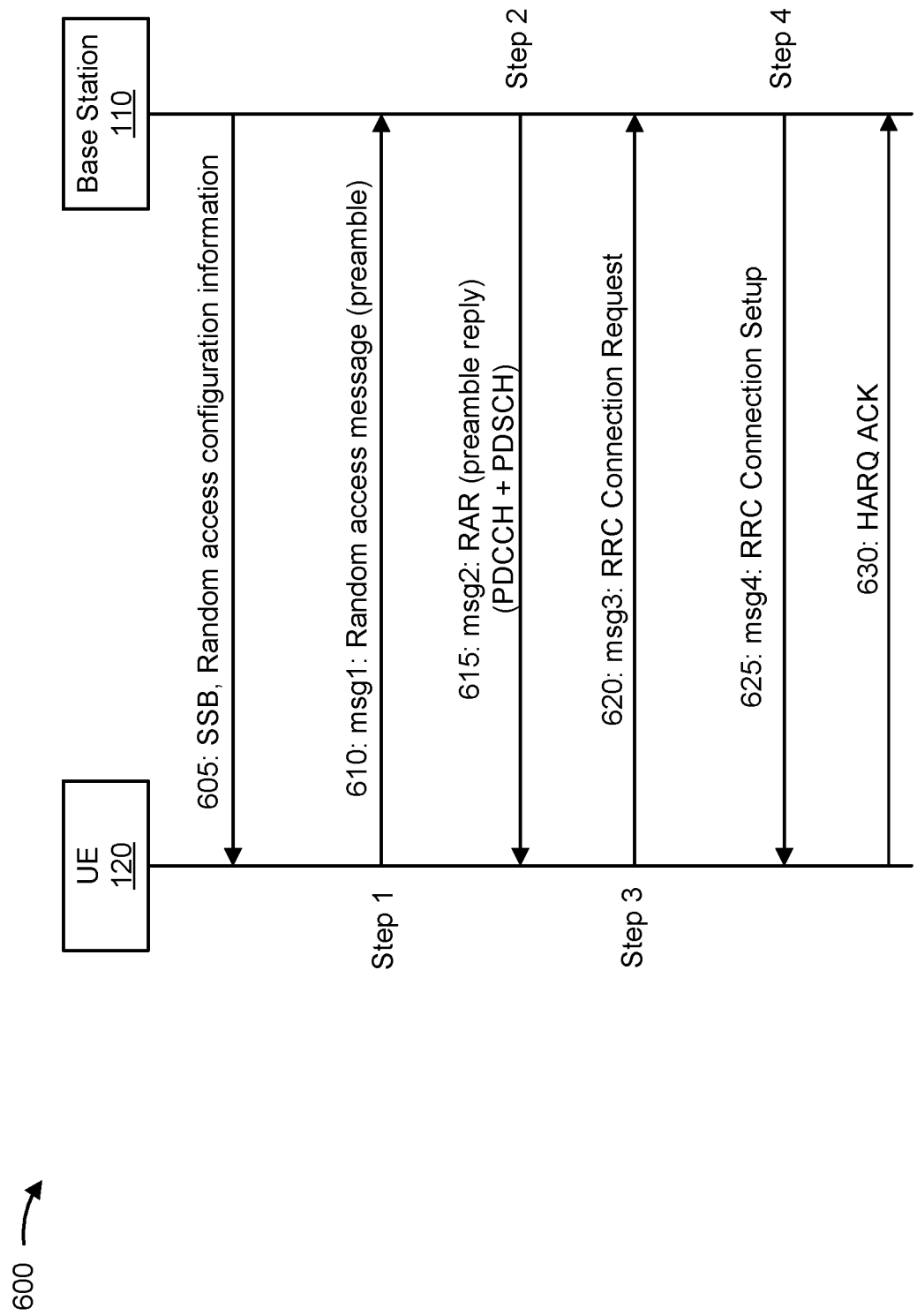
FIG. 6 is a diagram illustrating an example of a four-step random access procedure, in accordance with the present disclosure.

FIG. 6 is a diagram illustrating an example 600 of a four-step random access procedure, in accordance with the present disclosure. As shown in FIG. 6, a base station 110 and a UE 120 may communicate with one another to perform the four-step random access procedure.

As shown by reference number 605, the base station 110 may transmit, and the UE 120 may receive, one or more SSBs and random access configuration information. In some aspects, the random access configuration information may be transmitted in and/or indicated by system information (SI) (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a RAM and/or one or more parameters for receiving an RAR. For example, the random access configuration may identify a set of RACH occasions (ROs) in which resources are allocated for communications associated with a RACH procedure.

As shown by reference number 610, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

As shown by reference number 615, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

As part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also, as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 620, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request).

As shown by reference number 625, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 630, if the UE 120 successfully receives the RRC connection setup message, the UE 120 may transmit a HARQ ACK.

As indicated above, FIG. 6 is provided as an example. Other examples may differ from what is described with regard to FIG. 6.

RACH procedures, such as a two-step RACH procedure or a four-step RACH procedure, as described above, may use energy resources of a network node, such as a DU of a base station (e.g., a DU that is communicating with another network node, such as a UE). To reduce a utilization of energy resources, the network node may periodically enter an energy-saving mode. For example, the DU may be configured to enter an energy-saving mode during a subset of time resources in a set of slots. In the energy-saving mode, the DU may be configured to forgo certain periodic monitoring or transmitting, reduce a quantity of antennas that are used for communication (e.g., relative to a non-energy-saving mode) or change which analog to digital converters (ADCs) or digital to analog converters (DACs) are used for communication (e.g., from a high-resolution ADC to a low-resolution ADC). Reducing energy resource utilization by entering the energy-saving mode may enable the DU to be used in certain deployments, such as in self-organizing network (SON) deployments or minimization of drive test (MDT) deployments.

However, when a network node is configured for a RACH procedure, a configuration for the RACH procedure may not take into account that the network node is operating in an energy-saving mode. As a result, communication performance may be poor or interrupted as a result of a reception power, a preamble format, a subcarrier spacing (SCS), or a reference signal received power (RSRP) threshold, among other examples, being poorly aligned to a configuration of the network node in the energy-saving mode (e.g., the network node using a low-resolution ADC).

Some aspects described herein enable configuration of ROs with a RACH configuration aligned to the energy-saving mode of a network node. For example, a DU may be configured with a first set of ROs aligned to the energy-saving mode (e.g., in time resources in which the DU is in the energy-saving mode) and a second set of ROs aligned to a non-energy-saving mode (e.g., in time resources in which the DU is not in the energy-saving mode). In this case, the first set of ROs, which may be termed "low-resolution ROs," may be associated with a first RACH configuration for a two-step RACH procedure (e.g., in which a DU uses a low-resolution ADC) and the second set of ROs, which may be termed "high-resolution ROs," may be associated with a second RACH configuration for a four-step RACH procedure (e.g., in which the DU uses a high-resolution ADC). Additionally, or alternatively, the first set of ROs may be associated with a first RACH configuration for a two-step RACH procedure and the energy-saving mode, and the second set of ROs may be associated with a second RACH configuration for a two-step RACH procedure and the non-energy-saving mode. In this case, the different RACH configurations account for different detection reliabilities associated with use of different ADCs, thereby improving communication performance and avoiding communication interruptions relative to using a single RACH configuration for all ROs for four-step RACH procedures.

Figure 7:
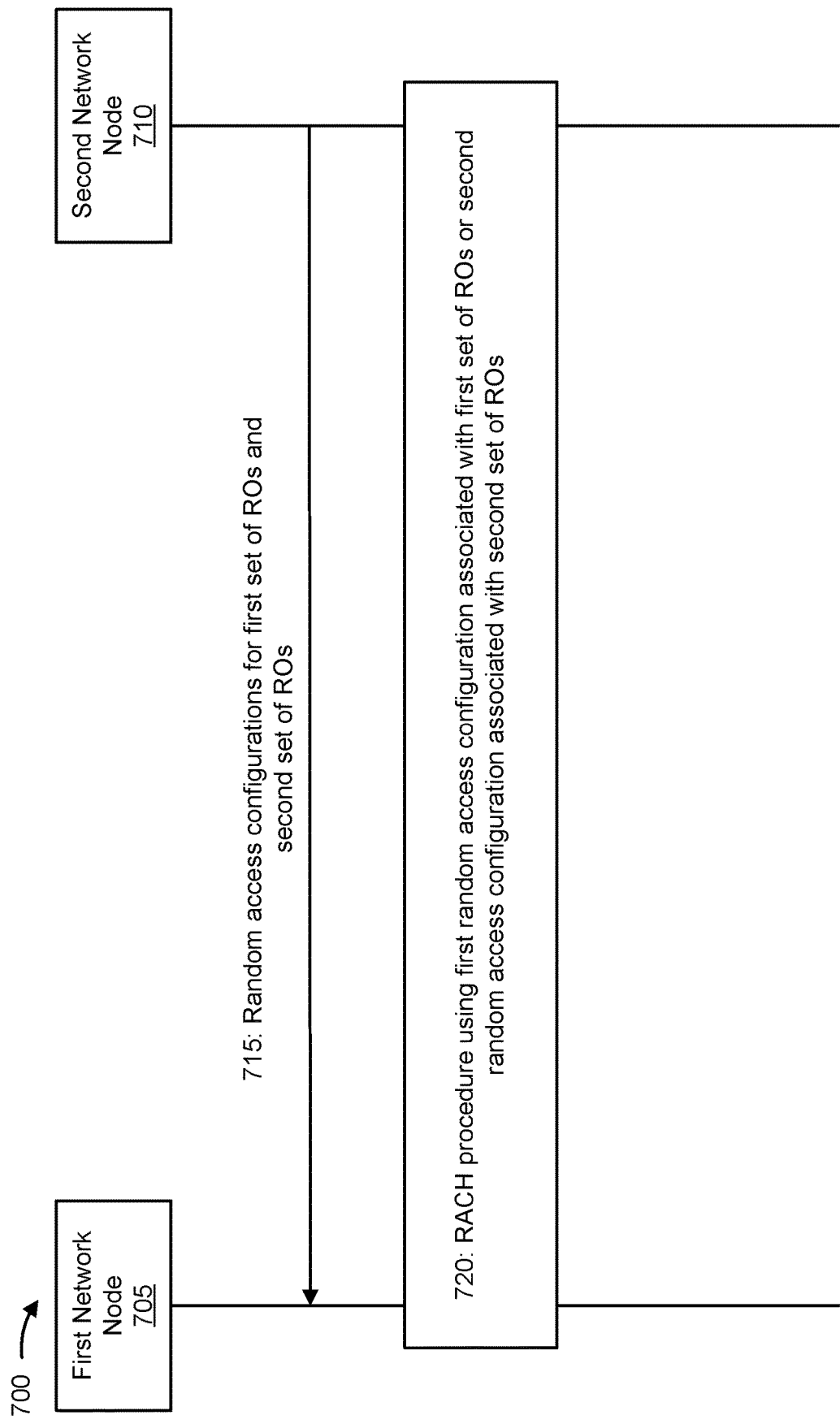
FIG. 7 is a diagram illustrating an example associated with an energy-saving two-step random access channel procedure, in accordance with the present disclosure.

FIG. 7 is a diagram illustrating an example 700 associated with a four-step RACH procedure. As shown in FIG. 7, a first network node 705 (e.g., a UE 120) and a second network node 710 (e.g., a DU of a base station 110) may communicate with one another.

As shown by reference number 715, first network node 705 may receive information identifying random access configurations for a first set of ROs and a second set of ROs. For example, second network node 710 may configure, for first network node 705, a first set of ROs associated with a first random access configuration (e.g., a first set of parameters) and a second set of ROs associated with a second random access configuration (e.g., a second set of parameters). In this case, the first set of ROs may be associated with (e.g., occur in time resources of) an energy-saving mode of the second network node 710, and the second set of ROs may be associated with (e.g., occur in time resources of) a non-energy-saving mode of the second network node 710.

In some aspects, the energy-saving mode may correspond to a period of time in which the second network node 710 uses a low-resolution ADC (e.g., which uses less energy than a high-resolution ADC) and the non-energy-saving mode may be a period in which the second network node 710 uses the high-resolution ADC (e.g., which uses more energy than the low-resolution ADC). The terms "low-resolution" and "high-resolution" may be relative terms, such that the low-resolution ADC is an ADC with lower resolution than the high-resolution ADC. In some aspects, the second network node 710 may have a single ADC that can operate a multiple resolutions. In this case, "the low-resolution ADC" may refer to the single ADC operating at a lower resolution and "the high-resolution ADC" may refer to the single ADC operating at a higher resolution.

In some aspects, the first random access configuration and the second random access configuration may differ with respect to a type of RACH procedure. For example, the first random access configuration, for the energy-saving mode, may be associated with a two-step RACH procedure. In contrast, the second random access configuration, for the non-energy-saving mode, may be associated with a four-step RACH procedure. In this case, the first set of ROs may be ROs for a two-step RACH procedure (e.g., in which second network node 710 uses a low-resolution ADC) and the second set of ROs may be ROs for a four-step RACH procedure (e.g., in which second network node 710 uses a high-resolution ADC).

In some aspects, the first random access configuration and the second random access configuration may be associated with the same type of RACH procedure. For example, the first random access configuration and the second random access configuration may each be for a two-step RACH procedure. In this case, the random access configurations may differ with regard to one or more parameters. For example, the first random access configuration may have a parameter identifying a larger gap between a msgA preamble and a msgA payload than is identified in the second random access configuration.

The larger gap identified in the first random access configuration may enable the second network node 710 to switch from using a low-resolution ADC to using a high-resolution ADC (e.g., the energy-saving mode may be associated with a partial usage of a low-resolution ADC). For example, the first random access configuration, for the energy-saving mode, may be associated with a two-step RACH procedure in which the second network node 710 uses the low-resolution ADC for reception of a RACH preamble (e.g., a msgA preamble) and switches to using the high-resolution ADC for reception of an associated msgA payload based at least in part on detection of the RACH preamble. In this case, the second network node 710 achieves energy saving for detection of the RACH preamble and higher reliability for reception and processing of the msgA payload. To account for the switching, the first random access configuration has the aforementioned larger gap, thereby avoiding missed data associated with the second network node 710 switching ADCs in the energy-saving mode and avoiding excess latency from an excessive gap in the non-energy-saving mode (where switching is not performed).

In another example, the first random access configuration may indicate a shorter gap between a msgA preamble and a msgA payload than is indicated in the second random access configuration. For example, second network node 710 may use a high-resolution ADC in both the energy-saving mode and the non-energy-saving mode, but may have a shorter gap between the msgA preamble and the msgA payload in the energy-saving mode, thereby enabling the second network node 710 to operate in an on duration for a shorter period of time than in the non-energy-saving mode. By reducing the on duration, the second network node 710 achieves energy saving relative to the non-energy-saving mode.

In some aspects, the first random access configuration may indicate a repetition parameter for transmission of a msgA payload that is different from a repetition parameter of the second random access configuration. For example, the second network node 710 may configure the first network node 705 to repeat a msgA payload across a plurality of payload transmission occasions (e.g., consecutive occasions). In this case, when the second network node 710 is using a low-resolution ADC, repetition of the msgA payload increases a reliability of successful reception of the msgA payload, thereby compensating for the usage of the low-resolution ADC and allowing a reduction in usage of energy resources in the energy-saving mode. In contrast, when the second network node 710 is using the high-resolution ADC, first network node 705 may not repeat transmission (or may transmit fewer repetitions) of the msgA payload, thereby improving throughput in the non-energy-saving mode.

As further shown in FIG. 7, and by reference number 720, first network node 705 and second network node 710 communicate to perform a RACH procedure (e.g., a two-step RACH procedure or a four-step RACH procedure), as described above. For example, when using the first set of ROs for the RACH procedure (e.g., during an energy-saving mode of the second network node 710), first network node 705 and second network node 710 may use the first RACH configuration. In contrast, when using the second set of ROs for the RACH procedure (e.g., during a non-energy-saving mode of the second network node 710), first network node 705 and second network node 710 may use the second RACH configuration. In this case, when first network node 705 initiates a RACH procedure, first network node 705 ensures that a mode of the second network node 710 (e.g., whether second network node 710 is using a low-resolution ADC or a high-resolution ADC) is accounted for, thereby improving RACH performance relative to using a single RACH configuration for all ROs or multiple RACH configurations that are not aligned to whether the second network node 710 is using an energy-saving mode.

As indicated above, FIG. 7 is provided as an example. Other examples may differ from what is described with respect to FIG. 7.

Figure 8:
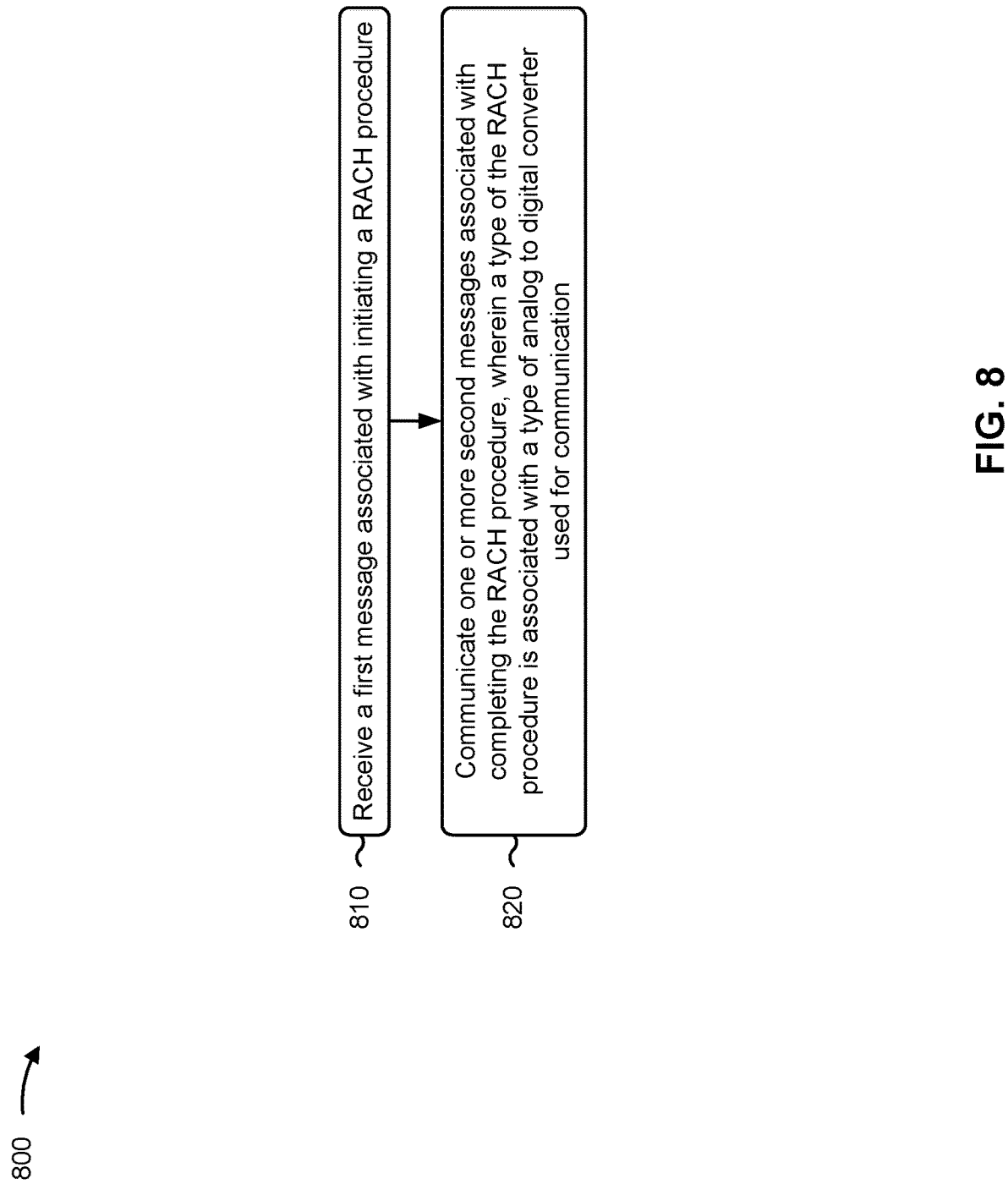
FIGS. 8-9 are diagrams illustrating example processes associated with an energy-saving two-step random access channel procedure, in accordance with the present disclosure.

FIG. 8 is a diagram illustrating an example process 800 performed, for example, by a network node, in accordance with the present disclosure. Example process 800 is an example where the network node (e.g., network node 710)

performs operations associated with an energy-saving two-step random access channel procedure.

As shown in FIG. 8, in some aspects, process 800 may include receiving a first message associated with initiating a RACH procedure (block 810). For example, the network node (e.g., using communication manager 150 and/or reception component 1002, depicted in FIG. 10) may receive a first message associated with initiating a RACH procedure, as described above.

As further shown in FIG. 8, in some aspects, process 800 may include communicating one or more second messages associated with completing the RACH procedure, wherein a type of the RACH procedure is associated with a type of analog to digital converter used for communication (block 820). For example, the network node (e.g., using communication manager 150 and/or reception component 1002 or transmission component 1004, depicted in FIG. 10) may communicate one or more second messages associated with completing the RACH procedure, wherein a type of the RACH procedure is associated with a type of analog to digital converter used for communication, as described above.

Process 800 may include additional aspects, such as any single aspect or any combination of aspects described below and/or in connection with one or more other processes described elsewhere herein.

In a first aspect, the network node is configured with a first RACH configuration and a second RACH configuration, and the type of the RACH procedure is associated with the first RACH configuration or the second RACH configuration.

In a second aspect, alone or in combination with the first aspect, the first RACH configuration is associated with a first set of RACH occasions and the second RACH configuration is associated with a second set of RACH occasions that is at least partially different from the first set of RACH occasions.

In a third aspect, alone or in combination with one or more of the first and second aspects, the type of RACH procedure is a two-step RACH procedure or a four-step RACH procedure.

In a fourth aspect, alone or in combination with one or more of the first through third aspects, the type of the analog to digital converter is a low-resolution analog to digital converter or a high-resolution analog to digital converter.

In a fifth aspect, alone or in combination with one or more of the first through fourth aspects, the type of RACH procedure is associated with an energy-saving mode or a non-energy-saving mode.

In a sixth aspect, alone or in combination with one or more of the first through fifth aspects, the type of RACH procedure is a first type of two-step RACH procedure or a second type of two-step RACH procedure.

In a seventh aspect, alone or in combination with one or more of the first through sixth aspects, the first type of two-step RACH procedure is an energy-saving mode RACH procedure associated with use of a low-resolution analog to digital converter, and the second type of two-step RACH procedure is a non-energy-saving mode RACH procedure associated with use of a high-resolution analog to digital converter.

In an eighth aspect, alone or in combination with one or more of the first through seventh aspects, the type of RACH procedure is a first type of RACH procedure with a first gap period or a second type of RACH procedure with a second gap period, wherein the first gap period and the second gap period are gaps between a message A preamble and a message A payload.

In a ninth aspect, alone or in combination with one or more of the first through eighth aspects, the type of RACH procedure is a first type of RACH procedure with a first on duration or a second type of RACH procedure with a second on duration that is different from the first on duration.

In a tenth aspect, alone or in combination with one or more of the first through ninth aspects, the type of RACH procedure is a first type of RACH procedure with a first quantity of instances of transmitting a message A payload or a second type of RACH procedure with a second quantity of instances of transmitting the message A payload that is different from the first quantity.

In an eleventh aspect, alone or in combination with one or more of the first through tenth aspects, for an energy-saving mode type of RACH procedure, the network node is configured to detect a RACH preamble using a low-resolution analog to digital converter and process an associated message A payload using a high-resolution analog to digital converter.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
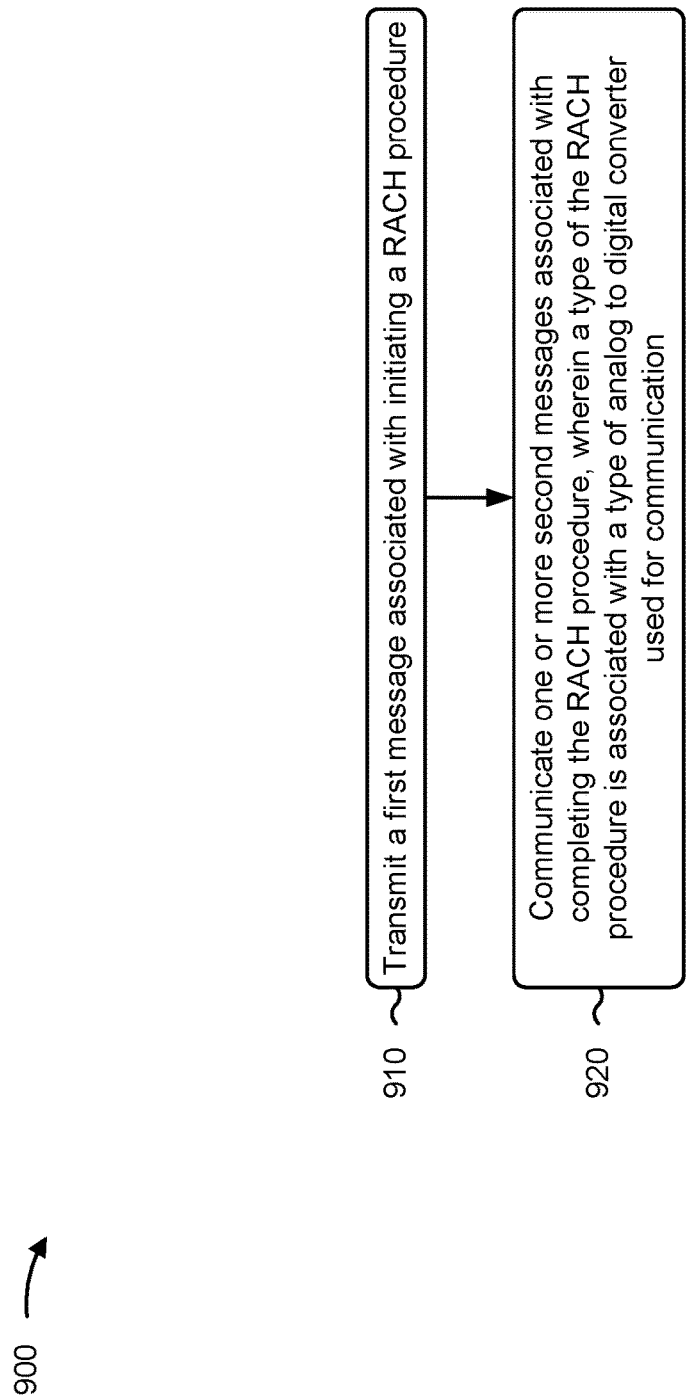

FIG. 9 is a diagram illustrating an example process 900 performed, for example, by a network node, in accordance with the present disclosure. Example process 900 is an example where the network node (e.g., network node 705) performs operations associated with an energy-saving two-step random access channel procedure.

As shown in FIG. 9, in some aspects, process 900 may include transmitting a first message associated with initiating a RACH procedure (block 910). For example, the network node (e.g., using communication manager 140 and/or transmission component 1004, depicted in FIG. 10) may transmit a first message associated with initiating a RACH procedure, as described above.

As further shown in FIG. 9, in some aspects, process 900 may include communicating one or more second messages associated with completing the RACH procedure, wherein a type of the RACH procedure is associated with a type of analog to digital converter used for communication (block 920). For example, the network node (e.g., using communication manager 140 and/or reception component 1002 or transmission component 1004, depicted in FIG. 10) may communicate one or more second messages associated with completing the RACH procedure, wherein a type of the RACH procedure is associated with a type of analog to digital converter used for communication, as described above.

Process 900 may include additional aspects, such as any single aspect or any combination of aspects described below and/or in connection with one or more other processes described elsewhere herein.

In a first aspect, the network node is configured with a first RACH configuration and a second RACH configuration, and the type of the RACH procedure is associated with the first RACH configuration or the second RACH configuration.

In a second aspect, alone or in combination with the first aspect, the first RACH configuration is associated with a first set of RACH occasions and the second RACH configuration is associated with a second set of RACH occasions that is at least partially different from the first set of RACH occasions.

In a third aspect, alone or in combination with one or more of the first and second aspects, the type of RACH procedure is a two-step RACH procedure or a four-step RACH procedure.

In a fourth aspect, alone or in combination with one or more of the first through third aspects, the type of the analog to digital converter is a low-resolution analog to digital converter or a high-resolution analog to digital converter.

In a fifth aspect, alone or in combination with one or more of the first through fourth aspects, the type of RACH procedure is associated with an energy-saving mode or a non-energy-saving mode.

In a sixth aspect, alone or in combination with one or more of the first through fifth aspects, the type of RACH procedure is a first type of two-step RACH procedure or a second type of two-step RACH procedure.

In a seventh aspect, alone or in combination with one or more of the first through sixth aspects, the first type of two-step RACH procedure is an energy-saving mode RACH procedure associated with use of a low-resolution analog to digital converter, and the second type of two-step RACH procedure is a non-energy-saving mode RACH procedure associated with use of a high-resolution analog to digital converter.

In an eighth aspect, alone or in combination with one or more of the first through seventh aspects, the type of RACH procedure is a first type of RACH procedure with a first gap period or a second type of RACH procedure with a second gap period, wherein the first gap period and the second gap period are gaps between a message A preamble and a message A payload.

In a ninth aspect, alone or in combination with one or more of the first through eighth aspects, the type of RACH procedure is a first type of RACH procedure with a first on duration or a second type of RACH procedure with a second on duration that is different from the first on duration.

In a tenth aspect, alone or in combination with one or more of the first through ninth aspects, the type of RACH procedure is a first type of RACH procedure with a first quantity of instances of transmitting a message A payload or a second type of RACH procedure with a second quantity of instances of transmitting the message A payload that is different from the first quantity.

In an eleventh aspect, alone or in combination with one or more of the first through tenth aspects, for an energy-saving mode type of RACH procedure, the network node is configured to detect a RACH preamble using a low-resolution analog to digital converter and process an associated message A payload using a high-resolution analog to digital converter.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
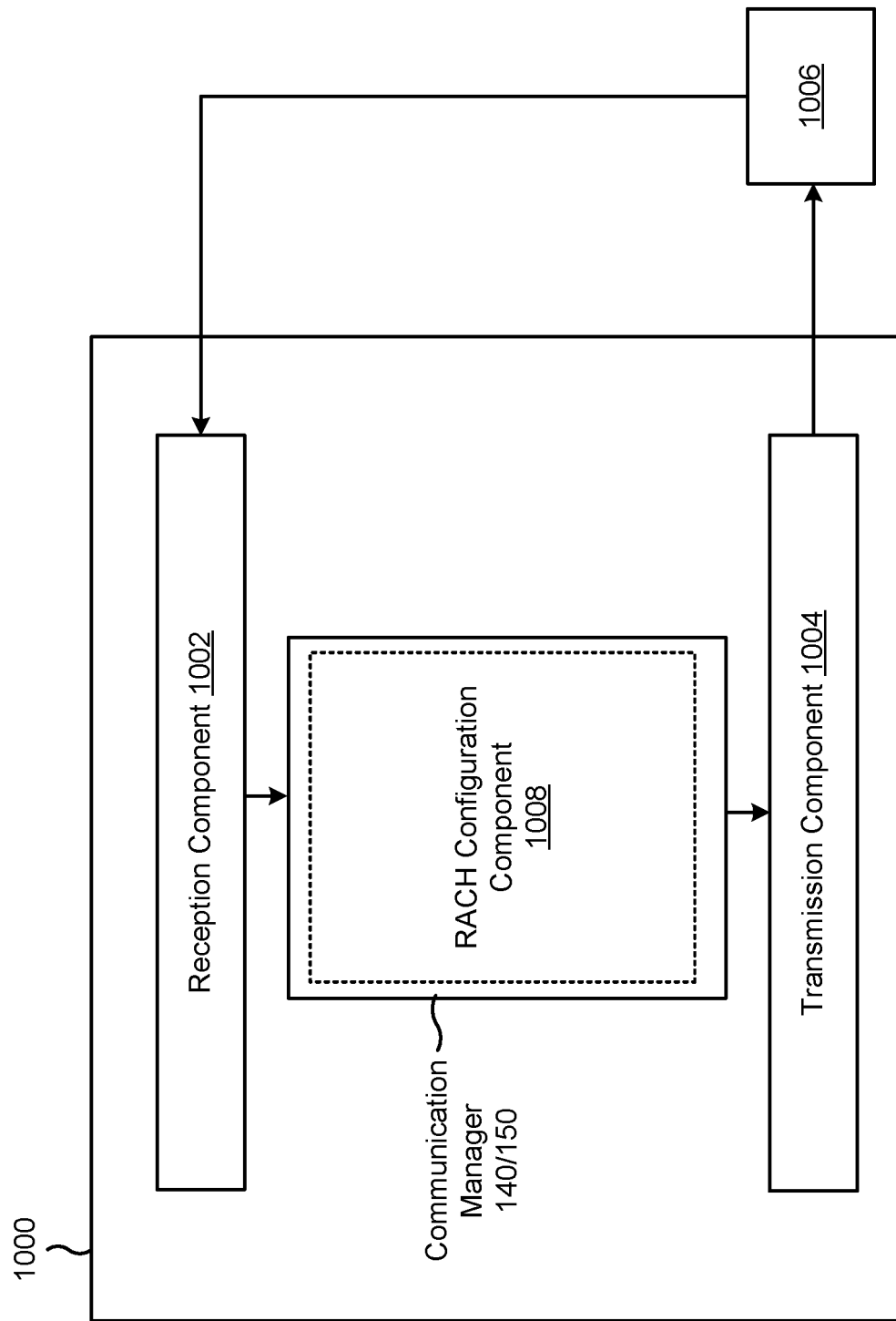
FIG. 10 is a diagram of an example apparatus for wireless communication, in accordance with the present disclosure.

FIG. 10 is a diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140 or 150. The communication manager 140 or 150 may include a RACH configuration component 1008, among other examples.

In some aspects, the apparatus 1000 may be configured to perform one or more operations described herein in connection with FIG. 5-7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The reception component 1002 may receive a first message associated with initiating a RACH procedure. The transmission component 1004 may transmit a first message associated with initiating a RACH procedure. The reception component 1002 and/or the transmission component 1004 may communicate one or more second messages associated with completing the RACH procedure, wherein a type of the RACH procedure is associated with a type of analog to digital converter used for communication. The RACH configuration component 1008 may configure the plurality of sets of ROs for the apparatus 1000 or for the apparatus 1006. The RACH configuration component 1008 may configure the plurality of sets of ROs, such that a first set of ROs is in time resources associated with at least partial usage of a low-resolution ADC or another energy-saving technique (e.g., a reduced gap between messages) by the apparatus 1000 or the apparatus 1006 and that a second set of ROs is in time resources associated with usage of a high-resolution ADC or a lack of usage of an energy-saving technique by the apparatus 1000 or the apparatus 1006.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a network node, comprising: receiving a first message associated with initiating a random access channel (RACH) procedure; and communicating one or more second messages associated with completing the RACH procedure, wherein a type of the RACH procedure is associated with a type of analog to digital converter used for communication.

Aspect 2: The method of Aspect 1, wherein the network node is configured with a first RACH configuration and a second RACH configuration, and the type of the RACH procedure is associated with the first RACH configuration or the second RACH configuration.

Aspect 3: The method of Aspect 2, wherein the first RACH configuration is associated with a first set of RACH occasions and the second RACH configuration is associated with a second set of RACH occasions that is at least partially different from the first set of RACH occasions.

Aspect 4: The method of any of Aspects 1 to 3, wherein the type of RACH procedure is a two-step RACH procedure or a four-step RACH procedure.

Aspect 5: The method of any of Aspects 1 to 4, wherein the type of the analog to digital converter is a low-resolution analog to digital converter or a high-resolution analog to digital converter.

Aspect 6: The method of any of Aspects 1 to 5, wherein the type of RACH procedure is associated with an energy-saving mode or a non-energy-saving mode.

Aspect 7: The method of any of Aspects 1 to 6, wherein, for an energy-saving mode type of RACH procedure, the network node is configured to detect a RACH preamble using a low-resolution analog to digital converter and process an associated message A payload using a high-resolution analog to digital converter.

Aspect 8: The method of any of Aspects 1 to 3 or 5 to 7, wherein the type of RACH procedure is a first type of two-step RACH procedure or a second type of two-step RACH procedure.

Aspect 9: The method of Aspect 8, wherein the first type of two-step RACH procedure is an energy-saving mode RACH procedure associated with use of a low-resolution analog to digital converter and the second type of two-step RACH procedure is a non-energy-saving mode RACH procedure associated with use of a high-resolution analog to digital converter.

Aspect 10: The method of any of Aspects 1 to 9, wherein the type of RACH procedure is a first type of RACH procedure with a first gap period or a second type of RACH procedure with a second gap period, wherein the first gap period and the second gap period are gaps between a message A preamble and a message A payload.

Aspect 11: The method of any of Aspects 1 to 10, wherein the type of RACH procedure is a first type of RACH procedure with a first on duration or a second type of RACH procedure with a second on duration that is different from the first on duration.

Aspect 12: The method of any of Aspects 1 to 11, wherein the type of RACH procedure is a first type of RACH procedure with a first quantity of instances of transmitting a message A payload or a second type of RACH procedure with a second quantity of instances of transmitting the message A payload that is different from the first quantity.

Aspect 13: A method of wireless communication performed by a network node, comprising: transmitting a first message associated with initiating a random access channel (RACH) procedure; and communicating one or more second messages associated with completing the RACH procedure, wherein a type of the RACH procedure is associated with a type of analog to digital converter used for communication.

Aspect 14: The method of Aspect 13, wherein the network node is configured with a first RACH configuration and a second RACH configuration, and the type of the RACH procedure is associated with the first RACH configuration or the second RACH configuration.

Aspect 15: The method of Aspect 14, wherein the first RACH configuration is associated with a first set of RACH occasions and the second RACH configuration is associated with a second set of RACH occasions that is at least partially different from the first set of RACH occasions.

Aspect 16: The method of any of Aspects 13 to 16, wherein the type of RACH procedure is a two-step RACH procedure or a four-step RACH procedure.

Aspect 17: The method of any of Aspects 13 to 17, wherein the type of the analog to digital converter is a low-resolution analog to digital converter or a high-resolution analog to digital converter.

Aspect 18: The method of any of Aspects 13 to 18, wherein the type of RACH procedure is associated with an energy-saving mode or a non-energy-saving mode.

Aspect 19: The method of any of Aspects 13 to 19, wherein, for an energy-saving mode type of RACH procedure, the network node is configured to detect a RACH preamble using a low-resolution analog to digital converter and process an associated message A payload using a high-resolution analog to digital converter.

Aspect 20: The method of any of Aspects 13 to 15 or 17 to 19, wherein the type of RACH procedure is a first type of two-step RACH procedure or a second type of two-step RACH procedure.

Aspect 21: The method of Aspect 20, wherein the first type of two-step RACH procedure is an energy-saving mode RACH procedure associated with use of a low-resolution analog to digital converter and the second type of two-step RACH procedure is a non-energy-saving mode RACH procedure associated with use of a high-resolution analog to digital converter.

Aspect 22: The method of any of Aspects 13 to 21, wherein the type of RACH procedure is a first type of RACH procedure with a first gap period or a second type of RACH procedure with a second gap period, wherein the first gap period and the second gap period are gaps between a message A preamble and a message A payload.

Aspect 23: The method of any of Aspects 13 to 22, wherein the type of RACH procedure is a first type of RACH procedure with a first on duration or a second type of RACH procedure with a second on duration that is different from the first on duration.

Aspect 24: The method of any of Aspects 13 to 23, wherein the type of RACH procedure is a first type of RACH procedure with a first quantity of instances of transmitting a message A payload or a second type of RACH procedure with a second quantity of instances of transmitting the message A payload that is different from the first quantity.

Aspect 25: An apparatus for wireless communication at a device, comprising a processor; memory coupled with the processor; and instructions stored in the memory and executable by the processor to cause the apparatus to perform the method of one or more of Aspects 1-12.

Aspect 26: A device for wireless communication, comprising a memory and one or more processors coupled to the memory, the one or more processors configured to perform the method of one or more of Aspects 1-12.

Aspect 27: An apparatus for wireless communication, comprising at least one means for performing the method of one or more of Aspects 1-12.

Aspect 28: A non-transitory computer-readable medium storing code for wireless communication, the code comprising instructions executable by a processor to perform the method of one or more of Aspects 1-12.

Aspect 29: A non-transitory computer-readable medium storing a set of instructions for wireless communication, the set of instructions comprising one or more instructions that, when executed by one or more processors of a device, cause the device to perform the method of one or more of Aspects 1-12.

Aspect 30: An apparatus for wireless communication at a device, comprising a processor; memory coupled with the processor; and instructions stored in the memory and executable by the processor to cause the apparatus to perform the method of one or more of Aspects 13-24.

Aspect 31: A device for wireless communication, comprising a memory and one or more processors coupled to the memory, the one or more processors configured to perform the method of one or more of Aspects 13-24.

Aspect 32: An apparatus for wireless communication, comprising at least one means for performing the method of one or more of Aspects 13-24.

Aspect 33: A non-transitory computer-readable medium storing code for wireless communication, the code comprising instructions executable by a processor to perform the method of one or more of Aspects 13-24.

Aspect 34: A non-transitory computer-readable medium storing a set of instructions for wireless communication, the set of instructions comprising one or more instructions that, when executed by one or more processors of a device, cause the device to perform the method of one or more of Aspects 13-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
   one or more memories; and
   one or more processors, coupled to the one or more memories, configured to:
      receive a first message associated with initiating a random access channel (RACH) procedure, wherein the first message includes information identifying at least a first RACH configuration for a set of RACH occasions associated with a type of energy mode and a type of RACH procedure,
         wherein the type of RACH procedure is a first type of RACH procedure with a first gap period or a second type of RACH procedure with a second gap period,
         wherein the type of energy mode associated with the first type of RACH procedure is an energy-saving mode, and wherein the type of energy mode associated with the second type of RACH procedure is a non-energy-saving mode;
         wherein the first gap period and the second gap period are gaps between a message A preamble and a message A payload, and
         wherein the first gap period is larger than the second gap period; and
      communicate one or more second messages associated with completing the RACH procedure, wherein the type of RACH procedure is associated with a type of analog to digital converter used for communication.

2. The network node of claim 1, wherein the network node is configured with the first RACH configuration and a second RACH configuration.

3. The network node of claim 2, wherein the set of RACH occasions is a first set of RACH occasions and the second RACH configuration is associated with a second set of RACH occasions that is at least partially different from the first set of RACH occasions.

4. The network node of claim 1, wherein the type of RACH procedure is a two-step RACH procedure or a four-step RACH procedure.

5. The network node of claim 1, wherein the type of the analog to digital converter is a low-resolution analog to digital converter or a high-resolution analog to digital converter.

6. The network node of claim 1, wherein, for an energy-saving mode type of RACH procedure, the network node is configured to detect a RACH preamble using a low-resolution analog to digital converter and process an associated message A payload using a high-resolution analog to digital converter.

7. The network node of claim 1, wherein the type of RACH procedure is a first type of two-step RACH procedure or a second type of two-step RACH procedure.

8. The network node of claim 7, wherein the first type of two-step RACH procedure is an energy-saving mode RACH procedure associated with use of a low-resolution analog to digital converter and the second type of two-step RACH procedure is a non-energy-saving mode RACH procedure associated with use of a high-resolution analog to digital converter.

9. The network node of claim 1, wherein the type of RACH procedure is a first type of RACH procedure with a first on duration or a second type of RACH procedure with a second on duration that is different from the first on duration.

10. The network node of claim 1, wherein the type of RACH procedure is a first type of RACH procedure with a first quantity of instances of transmitting a message A payload or a second type of RACH procedure with a second quantity of instances of transmitting the message A payload that is different from the first quantity.

11. A network node for wireless communication, comprising:
   one or more memories; and
   one or more processors, coupled to the one or more memories, configured to:
      transmit a first message associated with initiating a random access channel (RACH) procedure, wherein the first message includes information identifying at least a first RACH configuration for a set of RACH occasions associated with a type of energy mode and a type of RACH procedure,
         wherein the type of RACH procedure is a first type of RACH procedure with a first gap period or a second type of RACH procedure with a second gap period,
         wherein the type of energy mode associated with the first type of RACH procedure is an energy-saving mode, and wherein the type of energy mode associated with the second type of RACH procedure is a non-energy-saving mode;
         wherein the first gap period and the second gap period are gaps between a message A preamble and a message A payload, and
         wherein the first gap period is larger than the second gap period; and
      communicate one or more second messages associated with completing the RACH procedure, wherein the type of RACH procedure is associated with a type of analog to digital converter used for communication.

12. The network node of claim 11, wherein the network node is configured with the first RACH configuration and a second RACH configuration.

13. The network node of claim 12, wherein the set of RACH occasions is a first set of RACH occasions and the second RACH configuration is associated with a second set of RACH occasions that is at least partially different from the first set of RACH occasions.

14. The network node of claim 11, wherein the type of RACH procedure is a two-step RACH procedure or a four-step RACH procedure.

15. The network node of claim 11, wherein the type of the analog to digital converter is a low-resolution analog to digital converter or a high-resolution analog to digital converter.

16. The network node of claim 11, wherein, for an energy-saving mode type of RACH procedure, the network node is configured to detect a RACH preamble using a low-resolution analog to digital converter and process an associated message A payload using a high-resolution analog to digital converter.

17. The network node of claim 11, wherein the type of RACH procedure is a first type of two-step RACH procedure or a second type of two-step RACH procedure.

18. The network node of claim 17, wherein the first type of two-step RACH procedure is an energy-saving mode RACH procedure associated with use of a low-resolution analog to digital converter and the second type of two-step RACH procedure is a non-energy-saving mode RACH procedure associated with use of a high-resolution analog to digital converter.

19. The network node of claim 11, wherein the type of RACH procedure is a first type of RACH procedure with a first on duration or a second type of RACH procedure with a second on duration that is different from the first on duration.

20. The network node of claim 11, wherein the type of RACH procedure is a first type of RACH procedure with a first quantity of instances of transmitting a message A payload or a second type of RACH procedure with a second quantity of instances of transmitting the message A payload that is different from the first quantity.

21. A method of wireless communication performed by a network node, comprising:
  receiving a first message associated with initiating a random access channel (RACH) procedure, wherein the first message includes information identifying at least a first RACH configuration for a set of RACH occasions associated with a type of energy mode and a type of RACH procedure,
    wherein the type of RACH procedure is a first type of RACH procedure with a first gap period or a second type of RACH procedure with a second gap period,
    wherein the type of energy mode associated with the first type of RACH procedure is an energy-saving mode, and wherein the type of energy mode associated with the second type of RACH procedure is a non-energy-saving mode;
    wherein the first gap period and the second gap period are gaps between a message A preamble and a message A payload, and
  wherein the first gap period is larger than the second gap period; and
  communicating one or more second messages associated with completing the RACH procedure, wherein the type of RACH procedure is associated with a type of analog to digital converter used for communication.

22. The method of claim 21, wherein the network node is configured with the first RACH configuration and a second RACH configuration.

23. The method of claim 22, wherein the set of RACH occasions is a first set of RACH occasions and the second RACH configuration is associated with a second set of RACH occasions that is at least partially different from the first set of RACH occasions.

24. A method of wireless communication performed by a network node, comprising:
  transmitting a first message associated with initiating a random access channel (RACH) procedure, wherein the first message includes information identifying at least a first RACH configuration for a set of RACH occasions associated with a type of energy mode and a type of RACH procedure,
    wherein the type of RACH procedure is a first type of RACH procedure with a first gap period or a second type of RACH procedure with a second gap period,
    wherein the type of energy mode associated with the first type of RACH procedure is an energy-saving mode, and wherein the type of energy mode associated with the second type of RACH procedure is a non-energy-saving mode;
    wherein the first gap period and the second gap period are gaps between a message A preamble and a message A payload, and
  wherein the first gap period is larger than the second gap period; and
  communicating one or more second messages associated with completing the RACH procedure, wherein the type of RACH procedure is associated with a type of analog to digital converter used for communication.

25. The method of claim 24, wherein the network node is configured with the first RACH configuration and a second RACH configuration.

26. The method of claim 25, wherein the set of RACH occasions is a first set of RACH occasions and the second RACH configuration is associated with a second set of RACH occasions that is at least partially different from the first set of RACH occasions.

\* \* \* \* \*